(12) United States Patent
Alahmady

(10) Patent No.: US 11,087,357 B2
(45) Date of Patent: Aug. 10, 2021

(54) SYSTEMS AND METHODS FOR UTILIZING A MACHINE LEARNING MODEL TO PREDICT A COMMUNICATION OPT OUT EVENT

(71) Applicant: Verizon Patent and Licensing Inc., Arlington, VA (US)

(72) Inventor: Kaiss K. Alahmady, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 98 days.

(21) Appl. No.: 16/688,690

(22) Filed: Nov. 19, 2019

(65) Prior Publication Data

US 2021/0150569 A1 May 20, 2021

(51) Int. Cl.
*G06Q 30/00* (2012.01)
*G06Q 30/02* (2012.01)
*G06N 7/00* (2006.01)
*G06N 20/00* (2019.01)

(52) U.S. Cl.
CPC ......... *G06Q 30/0254* (2013.01); *G06N 7/005* (2013.01); *G06N 20/00* (2019.01); *G06Q 30/0234* (2013.01); *G06Q 30/0242* (2013.01); *G06Q 30/0244* (2013.01); *G06Q 30/0255* (2013.01); *G06Q 30/0261* (2013.01); *G06Q 30/0277* (2013.01)

(58) Field of Classification Search
CPC ........... G06Q 30/0234; G06Q 30/0242; G06Q 30/0244; G06Q 30/0254; G06Q 30/0255; G06Q 30/0261; G06Q 30/0269; G06Q 30/0271; G06Q 30/0277; G06Q 20/00
See application file for complete search history.

(56) References Cited

U.S. PATENT DOCUMENTS

| 10,325,284 B1* | 6/2019 | Aggarwal | G06Q 30/02 |
| 2010/0057548 A1* | 3/2010 | Edwards | G06Q 30/02 705/14.13 |
| 2015/0170171 A1* | 6/2015 | McCurnin | G06N 5/04 705/7.31 |

(Continued)

OTHER PUBLICATIONS

Kong, Ruoyan, et al. "Learning to Ignore: A Case Study of Organization-Wide Bulk EMail Effectiveness." Association for Computing Machinery, 2006. (Year: 2006).*

(Continued)

*Primary Examiner* — Luis A Brown

(57) ABSTRACT

A device may receive first customer data, and may receive first contact data. The device may generate second customer data that includes the first customer data, and may generate second contact data that includes the first contact data and additional contact data. The device may generate a quantity of simulated future communications based on differences between the first customer data and the second customer data and between the first contact data and the second contact data, and may process the quantity of simulated future communications, with a machine learning model, to determine a probability distribution for an opt out event. The device may determine a relationship between the quantity of simulated future communications and probabilities of the opt out event, and may identify a particular probability of the opt out event based on the relationship. The device may perform actions based on the particular probability.

20 Claims, 12 Drawing Sheets

(56) References Cited

U.S. PATENT DOCUMENTS

| | | | |
|---|---|---|---|
| 2016/0189210 A1* | 6/2016 | Lacey .................. | G06N 7/005 |
| | | | 705/7.31 |
| 2017/0017971 A1* | 1/2017 | Moreau .............. | G06Q 30/0255 |
| 2018/0097759 A1* | 4/2018 | Brechbuhl ......... | G06F 16/24578 |
| 2018/0219818 A1* | 8/2018 | Kramer .............. | G06Q 30/0277 |
| 2018/0314761 A1* | 11/2018 | Lewin-Eytan ...... | G06F 16/9535 |
| 2019/0034976 A1* | 1/2019 | Hamedi ............. | G06Q 30/0204 |
| 2019/0068526 A1* | 2/2019 | Xie ..................... | H04L 67/20 |
| 2020/0265449 A1* | 8/2020 | Sundararaj ......... | G06Q 30/0276 |
| 2020/0296739 A1* | 9/2020 | Monajemi ......... | H04W 72/1247 |

OTHER PUBLICATIONS

Kumar, V., et al. "Modeling Customer Opt-In and Opt-Out in a Permission-Based Marketing Context." Journal of Marketing Research, vol. LI, Aug. 2014. (Year: 2014).*

* cited by examiner

SYSTEMS AND METHODS FOR UTILIZING A MACHINE LEARNING MODEL TO PREDICT A COMMUNICATION OPT OUT EVENT

BACKGROUND

Companies constantly contact customers and/or prospective customers (e.g., referred to herein as customers) for marketing products and/or services. Marketing activities are generally conducted to increase revenue, reduce cost, improve customer services, enhance customer loyalty, and/or the like. A contact (e.g., a customer) may include any contactable person that a company markets to, sells to, engages with using various communication channels (e.g., email, telephone, social media, mail, in person, and/or the like), and/or the like. Customer contact may include a process of handling the customer before, during, and after a purchase or use of products and/or services, and/or as part of managing interaction or engagement between the company and the customer (e.g., customer relationship or engagement management).

In general, companies apply several contact strategies and tactics that are exercised at various touch points associated with a customer (e.g., before and after a person becomes a customer). For example, contact strategies may be employed during generation of customer awareness of a brand, a product, and/or a service; generation of customer familiarity with features of the brand, the product, and/or the service; performance of monetary or non-monetary transactions with the company; and/or the like. An overall objective is to manage relationships with customers through contact strategies focusing on needs of the customers, and to ensure that the contact strategies with the customers are relevant.

DETAILED DESCRIPTION OF PREFERRED EMBODIMENTS

Figure 1A:
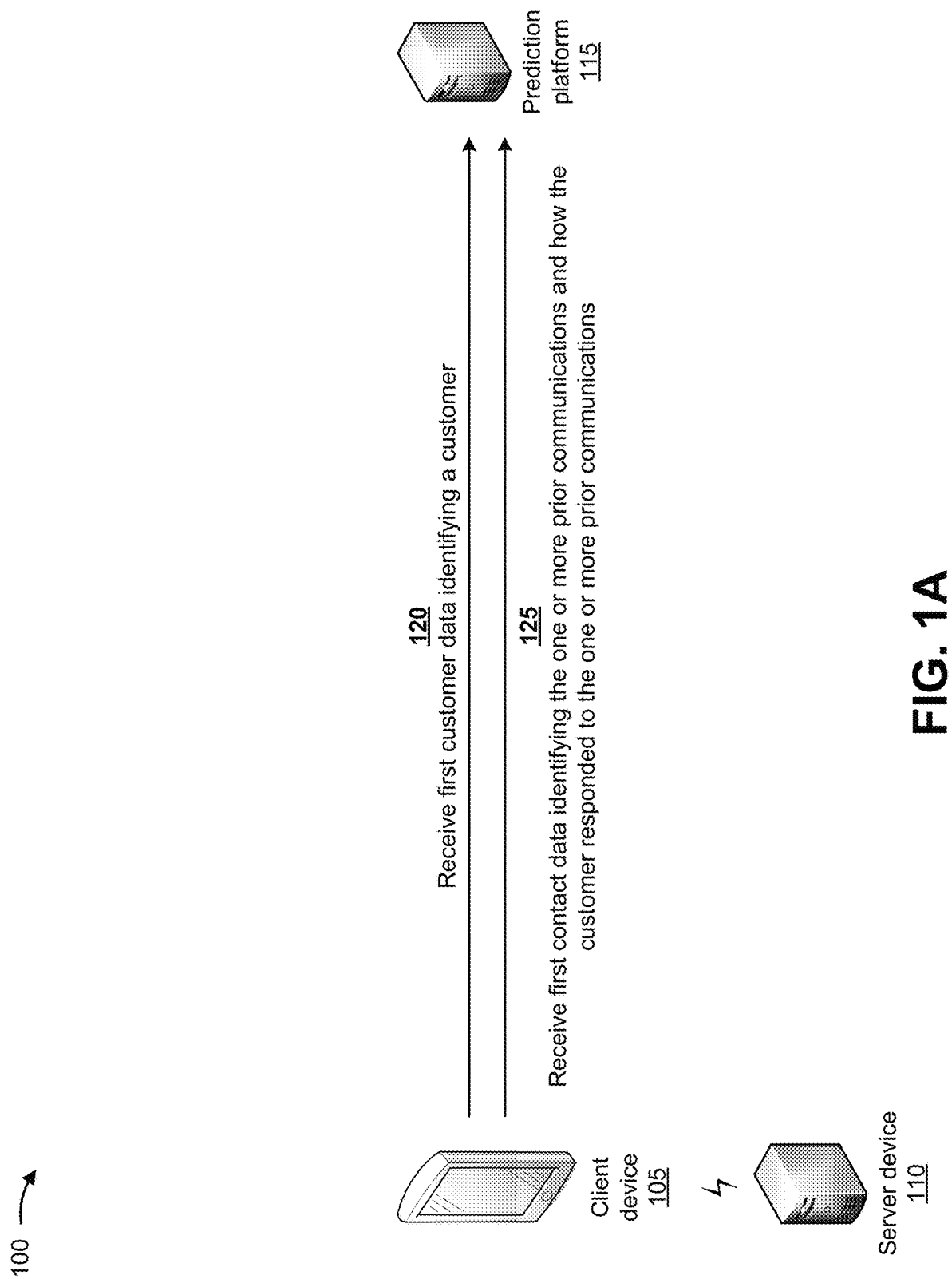
FIGS. 1A-1I are diagrams of one or more example implementations described herein.

The following detailed description of example implementations refers to the accompanying drawings. The same reference numbers in different drawings may identify the same or similar elements.

During customer contact, the customer may be able to opt out of receiving communications from or being contacted by the company. The term "opt out" refers to several methods by which customers can avoid receiving information about products and/or services or being contacted for marketing purposes. For example, in email marketing, a clickable link or "opt out button" may be included to provide an email recipient with an option to notify an email sender that the email recipient wishes to receive no further emails. Similar techniques can be incorporated into websites and mobile applications to enable a user of the websites and the mobile applications to make an opt out declaration. An opt out event represents a terminal event for marketing operations. Once a person opts out from receiving communications, marketing operations need to exclude the person from communication and campaign activities (e.g., due to regulation or good business practice), and are unable to further contact the person for marketing purposes. Customers may not initially choose to opt out of communications from the company, but over time may decide to make an opt out declaration. There may be many reasons for making such an opt out declaration, but one reason may be that the volume of communications to the consumer exceeds a preferred level of communications desired by such a customer. Currently, companies are unable to accurately predict at what level of communication customers will choose to opt out of communications with the companies (and therefore the preferred level of communications individual customers will want to receive from a company). Thus, current techniques waste resources (e.g., computing resources, networking resources, and/or the like) associated with generating unwanted customer communications (such as email, text messages, etc.), incorrect predictions of what level of communications may be preferred by customers and when customers will opt out of communications, causing customers to opt out of communications based on the incorrect predictions, efforts in attempting to encourage such customers to agree to receive communications again, and/or the like.

Some implementations described herein provide a prediction platform for utilizing a machine learning model to predict a communication opt out event. For example, the prediction platform may receive first customer data identifying a customer, and may receive first contact data identifying one or more prior communications and how the customer responded to the one or more prior communications. The prediction platform may train a machine learning model, with the first customer data and the first contact data, in order to generate a trained machine learning model, and may generate second customer data that includes the first customer data. The prediction platform may generate second contact data that includes the first contact data and additional contact data identifying at least one communication that occurred after the one or more prior communications, and may generate a quantity of simulated future communications based on differences between the first customer data and the second customer data and between the first contact data and the second contact data. The prediction platform may process the quantity of simulated future communications, with the trained machine learning model, to determine a probability distribution for an opt out event associated with the customer, and may determine a relationship between the quantity of simulated future communications and probabilities of the opt out event included in the probability distribution for the opt out event. The prediction platform may identify a particular probability of the opt out event based on the relationship between the quantity of simulated future communications and the probabilities of the opt out event, and may perform one or more actions based on the particular probability of the opt out event.

In this way, the prediction platform utilizes a machine learning model to predict a communication opt out event. The prediction platform may determine a quantity of incremental communications, to which a customer is exposed, that will likely cause the customer to opt out from receiving further communications. Once the quantity of incremental communications is determined, a contact strategy may be devised to eliminate or reduce chances of the customer opting out in the future (e.g., provide a communication intended to entice the customer to respond to the communication, include a stimulus to enhance the likelihood that the customer responds to the communication, and/or the like). Thus, the prediction platform conserves computing resources (e.g., processing resources, memory resources, communication resources), networking resources, and/or the like that would otherwise be wasted in sending unwanted communications to customers, generating incorrect predictions of what level of communications may be preferred by customers and when customers will opt out of communications, causing customers to opt out of communications based on the incorrect predictions, attempting to encourage such customers to agree to receive communications again, and/or the like. The platform allows for companies performing marketing activities to provide customers with a level of communications that is preferred by individual customers.

FIGS. 1A-1I are diagrams of one or more example implementations 100 described herein. As shown in FIG. 1A, a client device 105 may be associated with a server device 110 and a prediction platform 115. Client device 105 may include a mobile device, a computer, a telephone, a set-top box, and/or the like that a customer may utilize to interact with and/or receive information from server device 110 and/or prediction platform 115. Server device 110 may include a device that enables a company to conduct communications (e.g., transactions, emails, text messages, telephone calls, and/or the like) with client device 105. Prediction platform 115 may include a platform that utilizes a machine learning model to predict a communication opt out event associated with a customer.

As further shown in FIG. 1A, and by reference number 120, prediction platform 115 may receive first customer data identifying a customer. In some implementations, the first customer data may include data identifying demographics associated with the customer, a geographic location of the customer, segmentation (e.g., marketing segmentation) associated with the customer, a financial account of the customer, a time period that the customer is associated with an entity, usage of a product or a service of the entity by the customer, and/or the like. In some implementations, when receiving the first customer data, prediction platform 115 may receive, generate, and/or acquire two or more data elements associated with the customer. Each of the two or more data elements may include different information identifying a feature associated with the customer.

As further shown in FIG. 1A, and by reference number 125, prediction platform 115 may receive first contact data identifying the one or more prior communications and how the customer responded to the one or more prior communications. In some implementations, the first contact data may include data identifying means of communication associated with the one or more prior communications (e.g., an email, a telephone call, a social media post, postal mail, in-person, and/or the like); responsive actions taken by the customer in response to the one or more prior communications (e.g., data identifying whether the customer accepts the one or more prior communications, whether the customer rejects the one or more prior communications, whether the customer ignores the one or more prior communications, whether the customer receives the one or more prior communications, whether the customer opens the one or more prior communications, whether the customer selects one or more items included within the one or more prior communications, and/or the like); and/or the like. In some implementations, the first contact data may be obtained directly based on interacting with the customer (e.g., from client device 105 and/or server device 110), may be obtained externally from third party data sources, and/or the like.

Figure 1B:
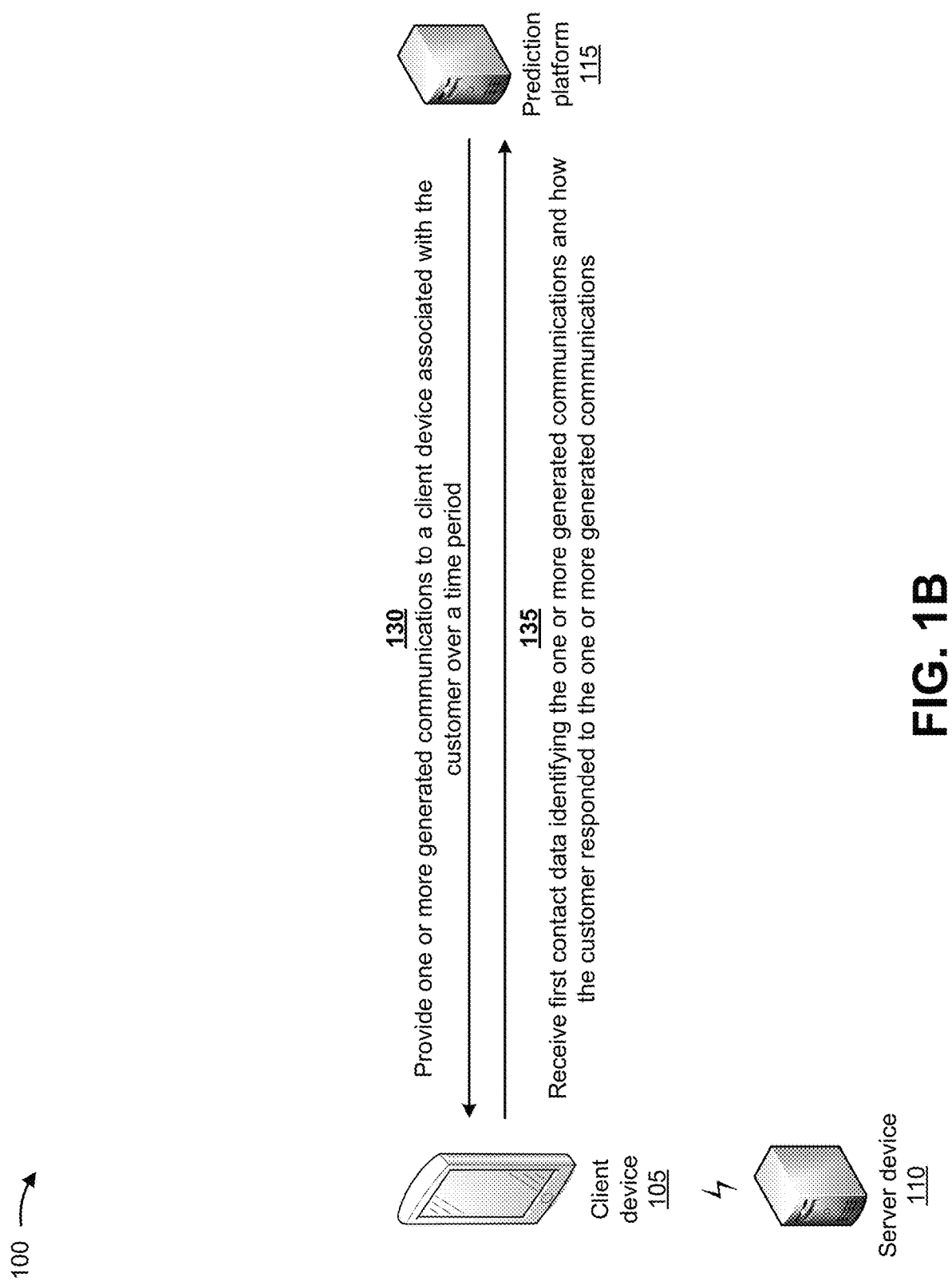

In some implementations, if the first contact data is not initially available, prediction platform 115 may cause the customer to receive one or more communications over a period of time, and may capture data associated with the communications and customer responses to the communications. For example, as shown in FIG. 1B, and by reference number 130, prediction platform 115 may provide one or more generated communications to client device 105 associated with the customer over a time period. Client device 105 may receive the one or more generated communications (e.g., or the customer may receive one or more of the generated communications in person), and the customer may perform an action (e.g., one of the actions described above in connection with the first contact data) in response to receiving the one or more generated communications.

As further shown in FIG. 1B, and by reference number 135, prediction platform 115 may receive, from client device 105 and based on providing the one or more generated communications, first contact data identifying the one or more generated communications and how the customer responded to the one or more generated communications. The first contact data may include data identifying means of communication associated with the one or more generated communications; responsive actions taken by the customer in response to the one or more generated communications, and/or the like.

Based on the first contact data, prediction platform 115 may characterize how the customer behaves with respect to the communications (e.g., the one or more prior communications or the one or more generated communications). For example, if the communications include an email communication, the customer behavior may include receiving the email communication, opening the email communication, and/or selecting one or more items (e.g., links) included within the email communication. In such an example, the first contact data may include data identifying the email communication sent by the sender, delivery of the email communication to the customer, opening of the email communication by the customer, one or more selections or reactions of the customer to the content of the email communication, one or more actions of the customer in response to the email communication, and/or the like. In some implementations, the occurrence of data included in the first contact data may be constructed as a time series where a particular data element, a time of the particular data element, and/or a time difference among different data elements may be included in the first contact data. For example, in the case of an email communication, the data elements may include an email sent data element, an email opened data element, an email data element, an opt out event data element, a timestamp for each data element, a time difference between two email data elements, a method of communication data element, a device to which the email is delivered data element, and/or the like.

Figure 1C:
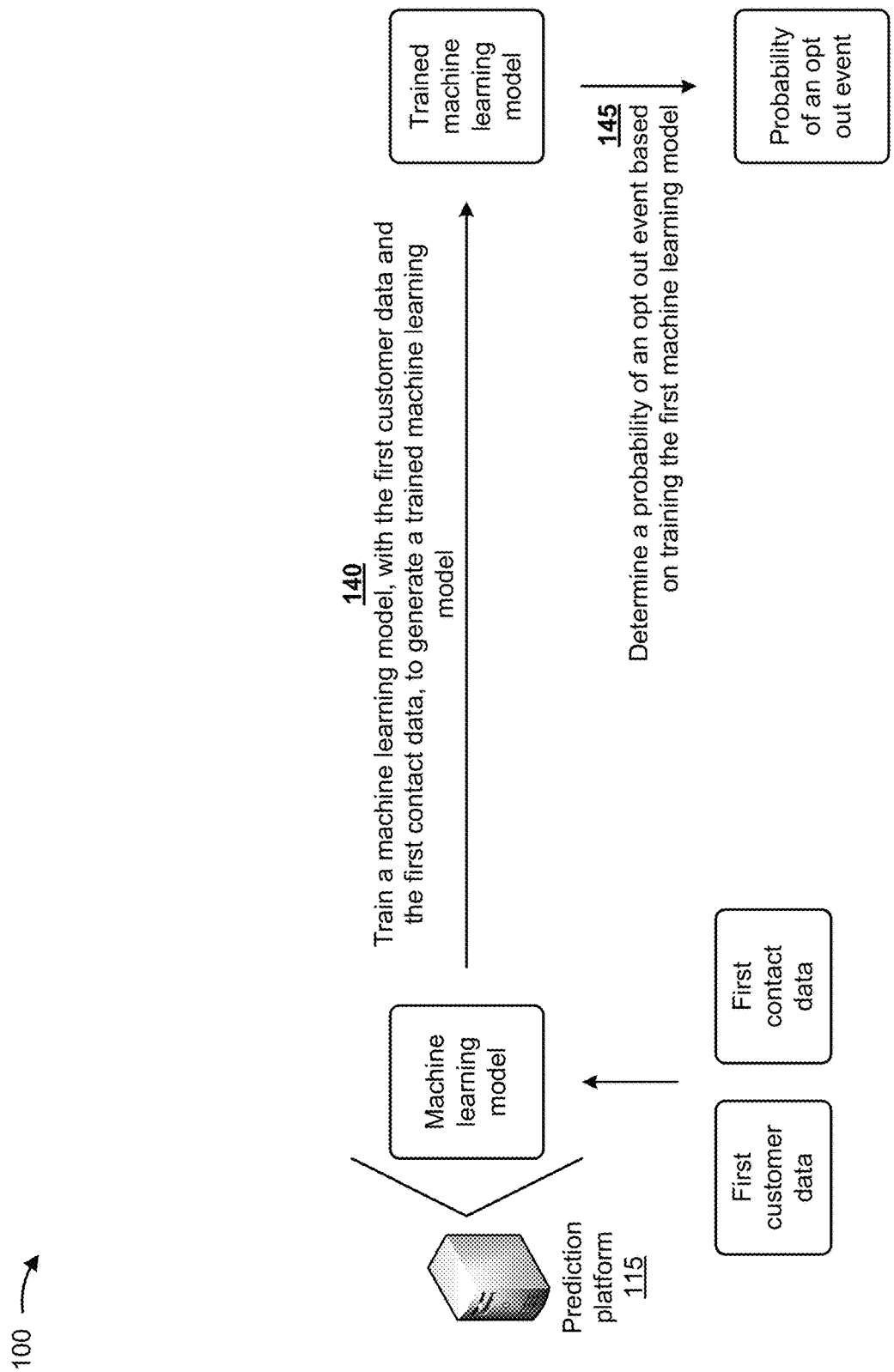

As shown in FIG. 1C, and by reference number 140, prediction platform 115 may train a machine learning model, with the first customer data and the first contact data, to generate a trained machine learning model. For example, the machine learning model may include an artificial intelligence model trained to generate a probability of an opt out event based on historical data (e.g., historical customer data and historical contact data). The output of the machine learning model may include an opt out event representation alone, or may include the opt out event representation and one or more additional data elements.

In some implementations, prediction platform 115 may train the machine learning model based on a customer of interest. In this case, prediction platform 115 may train the machine learning model based on historical data associated with a customer similar to the customer of interest, a group of customers similar to the customer of interest, and/or the like. Prediction platform 115 may determine a customer or group of customers to be similar to the customer of interest based on a similarity in demographics, financial information, transactions conducted by the customer, customer accounts, and/or the like associated with the customer or the group of customers.

In some implementations, prediction platform 115 may separate the historical data into a training set, a validation set, a test set, and/or the like. The training set may be utilized to train the machine learning model. The validation set may be utilized to validate results of the trained machine learning model. The test set may be utilized to test operation of the machine learning model.

In some implementations, prediction platform 115 may train the machine learning model using, for example, an unsupervised training procedure and based on the historical data. For example, prediction platform 115 may perform dimensionality reduction to reduce the historical data to a minimum feature set, thereby reducing resources (e.g., processing resources, memory resources, and/or the like) to train the machine learning model, and may apply a classification technique to the minimum feature set.

In some implementations, prediction platform 115 may use a logistic regression classification technique to determine a categorical outcome (e.g., that particular historical data indicates an opt out event). Additionally, or alternatively, prediction platform 115 may use a naïve Bayesian classifier technique. In this case, prediction platform 115 may perform binary recursive partitioning to split the historical data into partitions and/or branches and use the partitions and/or branches to determine outcomes (e.g., that particular historical data indicates an opt out event). Based on using recursive partitioning, prediction platform 115 may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, prediction platform 115 may use a support vector machine (SVM) classifier technique to generate a non-linear boundary between data points in the training set. In this case, the non-linear boundary is used to classify test data into a particular class.

Additionally, or alternatively, prediction platform 115 may train the machine learning model using a supervised training procedure that includes receiving input to the machine learning model from a subject matter expert, which may reduce an amount of time, an amount of processing resources, and/or the like to train the machine learning model relative to an unsupervised training procedure. In some implementations, prediction platform 115 may use one or more other model training techniques, such as a neural network technique, a latent semantic indexing technique, and/or the like. For example, prediction platform 115 may perform an artificial neural network processing technique (e.g., using a two-layer feedforward neural network architecture, a three-layer feedforward neural network architecture, and/or the like) to perform pattern recognition with regard to patterns of the historical data. In this case, using the artificial neural network processing technique may improve an accuracy of the trained machine learning model generated by prediction platform 115 by being more robust to noisy, imprecise, or incomplete data, and by enabling prediction platform 115 to detect patterns and/or trends undetectable to human analysts or systems using less complex techniques.

In some implementations, rather than training the machine learning model, prediction platform 115 may receive a trained machine learning model from another device (e.g., server device 110). For example, server device 110 may generate the machine learning model based on having trained the machine learning model in a manner similar to that described above, and may provide the trained machine learning model to prediction platform 115 (e.g., may pre-load prediction platform 115 with the machine learning model, may receive a request from prediction platform 115 for the trained machine learning model, and/or the like).

As further shown in FIG. 1C, and by reference number 145, prediction platform 115 may determine a probability of an opt out event based on training the machine learning model. For example, the machine learning model may determine the probability of the opt out event based on the historical data used in training the machine learning model, as described above. In some implementations, prediction platform 115 may represent the probability of the opt out event with a continuous value provided in a range (e.g., between zero and one) indicative of a likelihood of an opt out event to occur, where the starting range value (e.g., zero) may indicate a zero percent chance of occurrence of the opt out event and the ending range value (e.g., one) may indicate a one-hundred percent chance of occurrence of the opt out event.

Figure 1D:
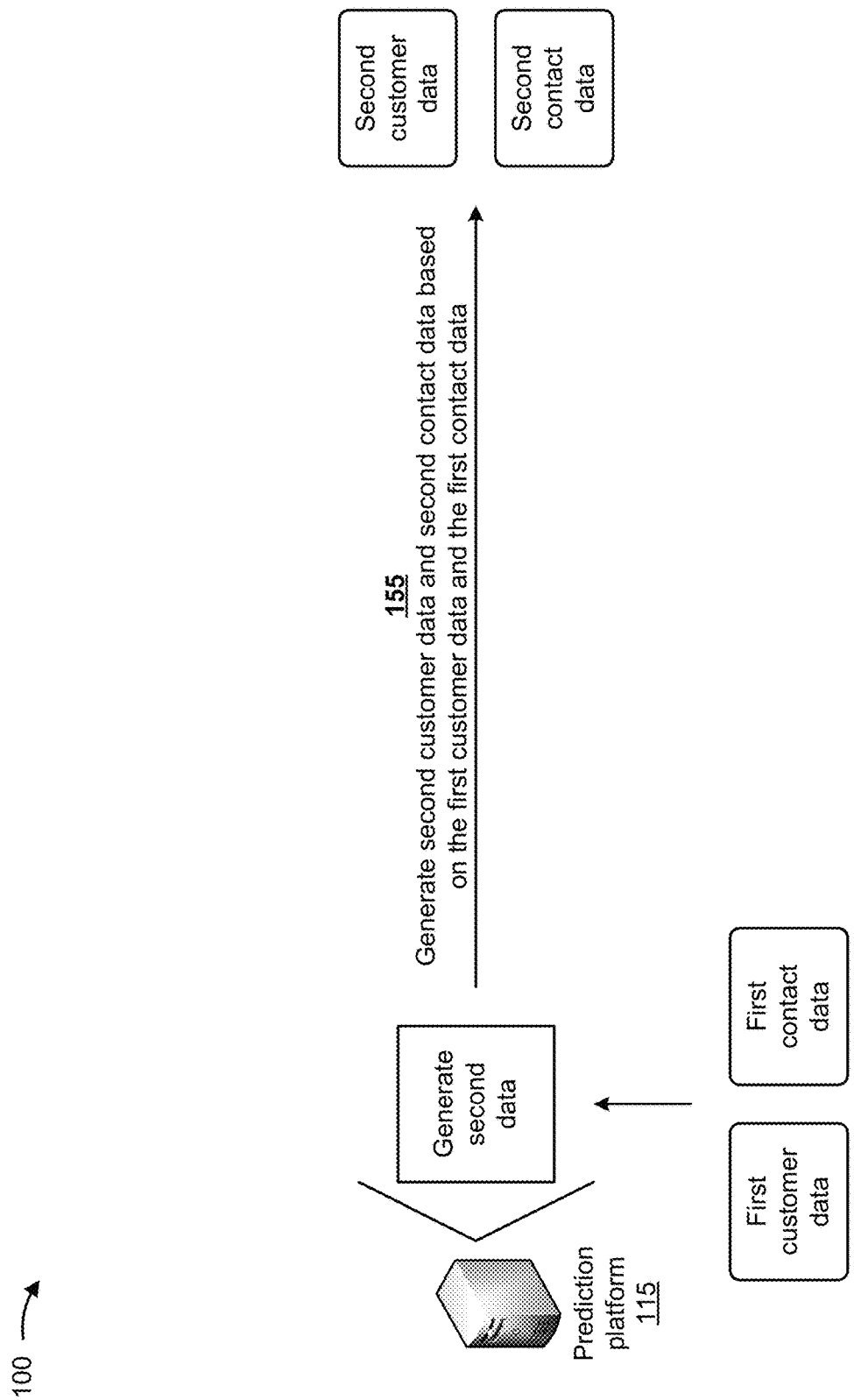

As shown in FIG. 1D, and by reference number 155, prediction platform 115 may generate second customer data and second contact data based on the first customer data and the first contact data. In some implementations, the second customer data may include the first customer data, the first customer data and additional customer data identifying the customer, and/or the like. The additional customer data may include data identifying the customer (e.g., demographics associated with the customer, a geographic location of the customer, segmentation associated with the customer, and/or the like) that is not included in the first customer data. For example, if the customer moves to a new geographic location, the additional customer data may include data identifying the new geographic location of the customer.

In some implementations, the second contact data may include the first contact data and additional contact data identifying at least one communication that occurs after the one or more prior communications. In some implementations, prediction platform 115 may require the second contact data to include at least one data element not included in the first contact data (e.g., a data element identifying at least one communication that occurs after the one or more prior communications). Additionally, prediction platform 115 may require the at least one data element to be associated with an event that occurs at a time that is later than any of the times associated with the data elements included in the first contact data. For example, prediction platform 115 may establish a date and a time associated with the first customer data and the first contact data, where the first contact data may include data that is received prior to the date and the time, and the second contact data may include at least one data element associated with an event that occurs after the date and the time.

Figure 1E:
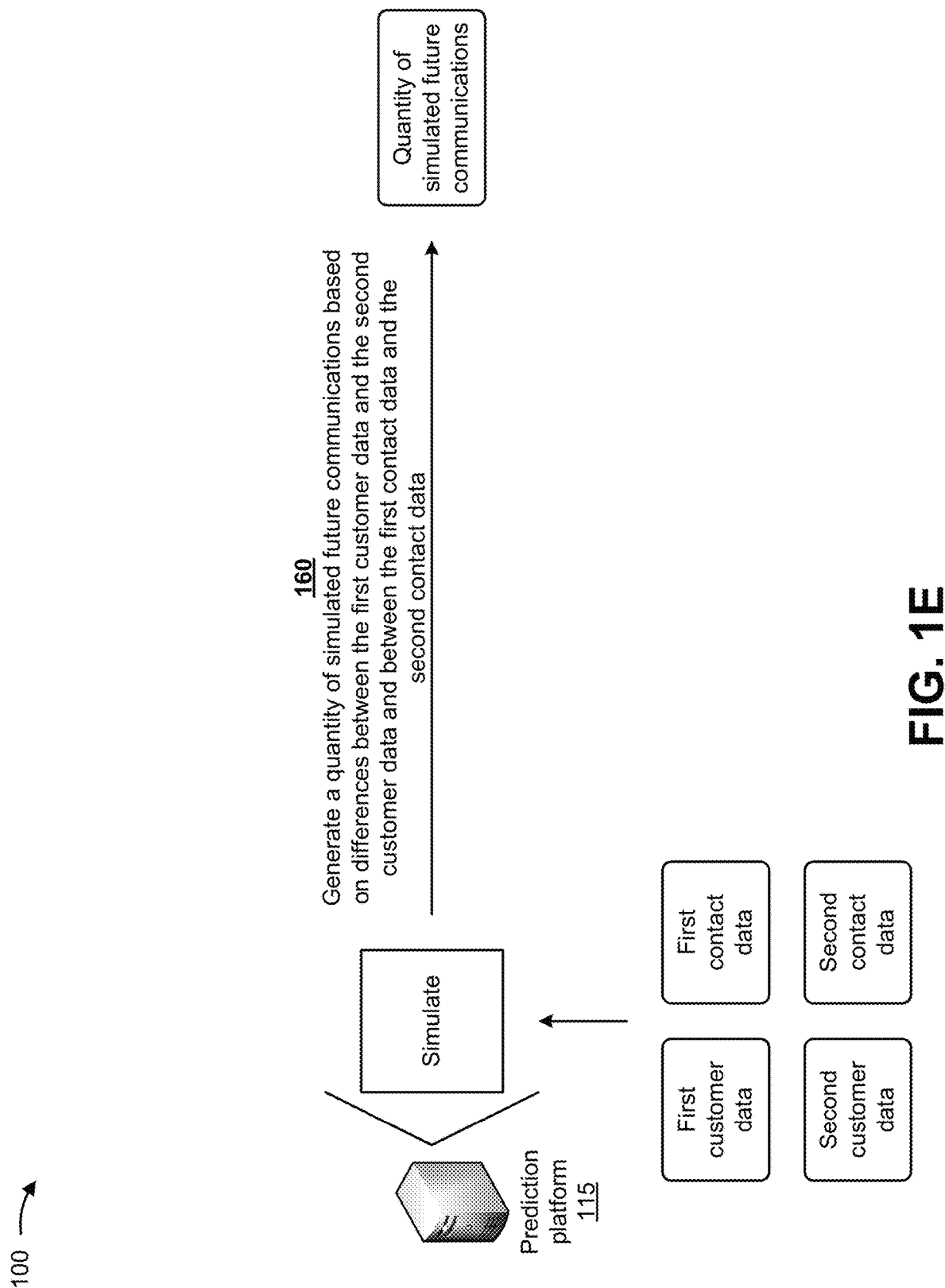

As shown in FIG. 1E, and by reference number 160, prediction platform 115 may generate a quantity of simulated future communications based on differences between the first customer data and the second customer data and between the first contact data and the second contact data. In some implementations, the simulated future communications may include a simulated email sent to the customer, a simulated text message sent to the customer, a simulated telephone call with the customer, a simulated social media post to the customer, and/or the like. In some implementations, the differences between the first customer data and the second customer data and between the first contact data and the second contact data may include differences discussed above in connection with FIG. 1D (e.g., the at least one data element of the second contact data that is not included in the first contact data). For example, if the second contact data includes data indicating that only new emails are sent to the customer, prediction platform 115 may utilize this data to determine that simulated future communications should include communications other than emails (e.g., text messages, social media posts, and/or the like).

Figure 1F:
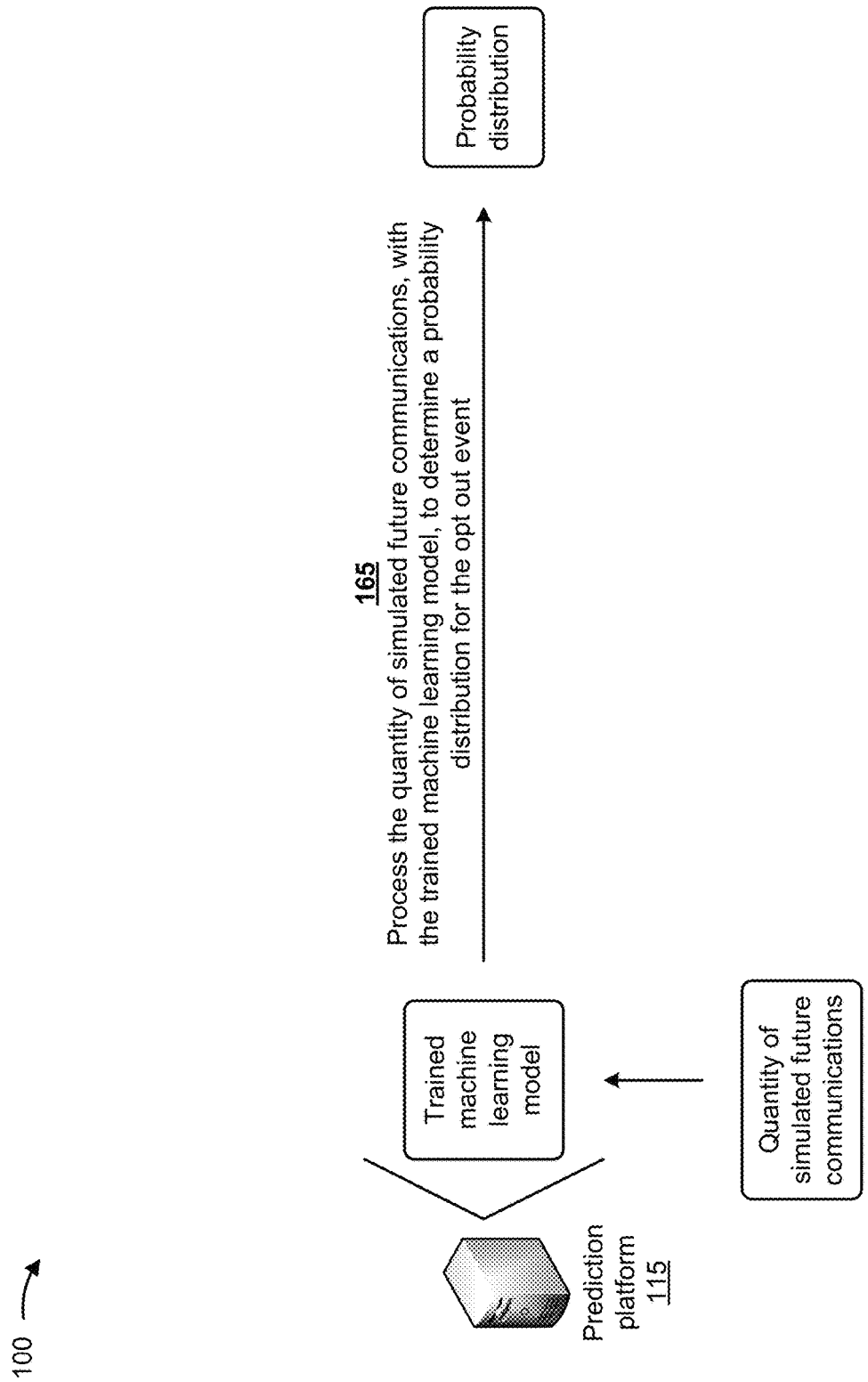

As shown in FIG. 1F, and by reference number 165, prediction platform 115 may process the quantity of simulated future communications, with the trained machine learning model, to determine a probability distribution for the opt out event. For example, prediction platform 115 may determine a probability of an opt out event for each of the quantity of simulated future communications, and the probabilities of the opt out event together may create the probability distribution for the opt out event. In some implementations, prediction platform 115 may represent the probability distribution with a continuous value provided in a range (e.g., between zero and one) indicative of a likelihood of the opt out event to occur, as described above. In some implementations, prediction platform 115 may process quantities of simulated future communications, with the trained machine learning model, for multiple customers (e.g., other than the customer), and may determine a probability distribution for each customer of the multiple customers.

In some implementations, when processing the quantity of simulated future communications with the trained machine learning model, prediction platform 115 may simulate provision of each of the quantity of simulated future communications to the customer, may determine each of the probabilities of the opt out event based on simulated provision of each of the quantity of simulated future communications to the customer, and may generate the probability distribution for the opt out event based on the probabilities of the opt out event.

In some implementations, rather than process the quantity of simulated future communications, with the trained machine learning model, prediction platform 115 may process the quantity of simulated future communications with a different model (e.g., a different machine learning model) than the trained machine learning model to determine the probability distribution for the opt out event. For example, the different model may be trained in a manner similar to the trained machine learning model, but may be trained with different or adjusted contact data.

Figure 1G:
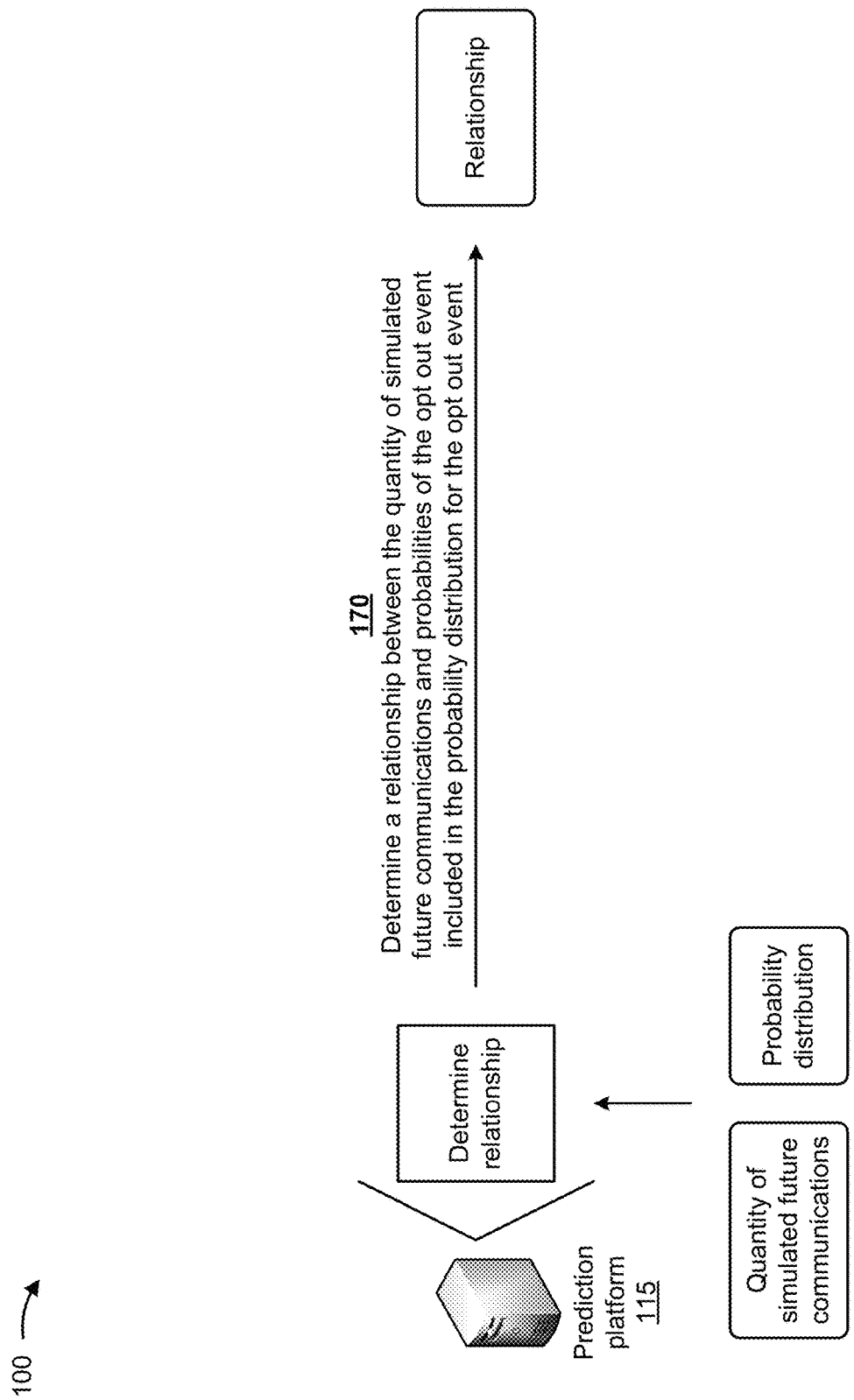

As shown in FIG. 1G, and by reference number 170, prediction platform 115 may determine a relationship between the quantity of simulated future communications and probabilities of the opt out event included in the probability distribution for the opt out event. In some implementations, the probability distribution for the opt out event associated with the customer may include a multi-dimensional distribution with the probabilities of the opt out event being on at least one dimension and the quantity of simulated future communications being on at least another dimension. For example, if a simulated future communication is an email sent to the customer and a target variable of interest is an opt out probability of the customer, the probability distribution for the customer may be a two-dimensional curve where the probability of the opt out event is on a first dimension and the quantity of simulated emails is on a second dimension. As another example, a simulated future communication is an email sent to the customer and type of email text, and the target variable of interest is an opt out probability of the customer, the probability distribution for the customer may be multi-dimensional where the probability of the opt out event is on a first dimension, a count of simulated emails is on a second dimension, and the type of email text is on a third dimension.

Figure 1H:
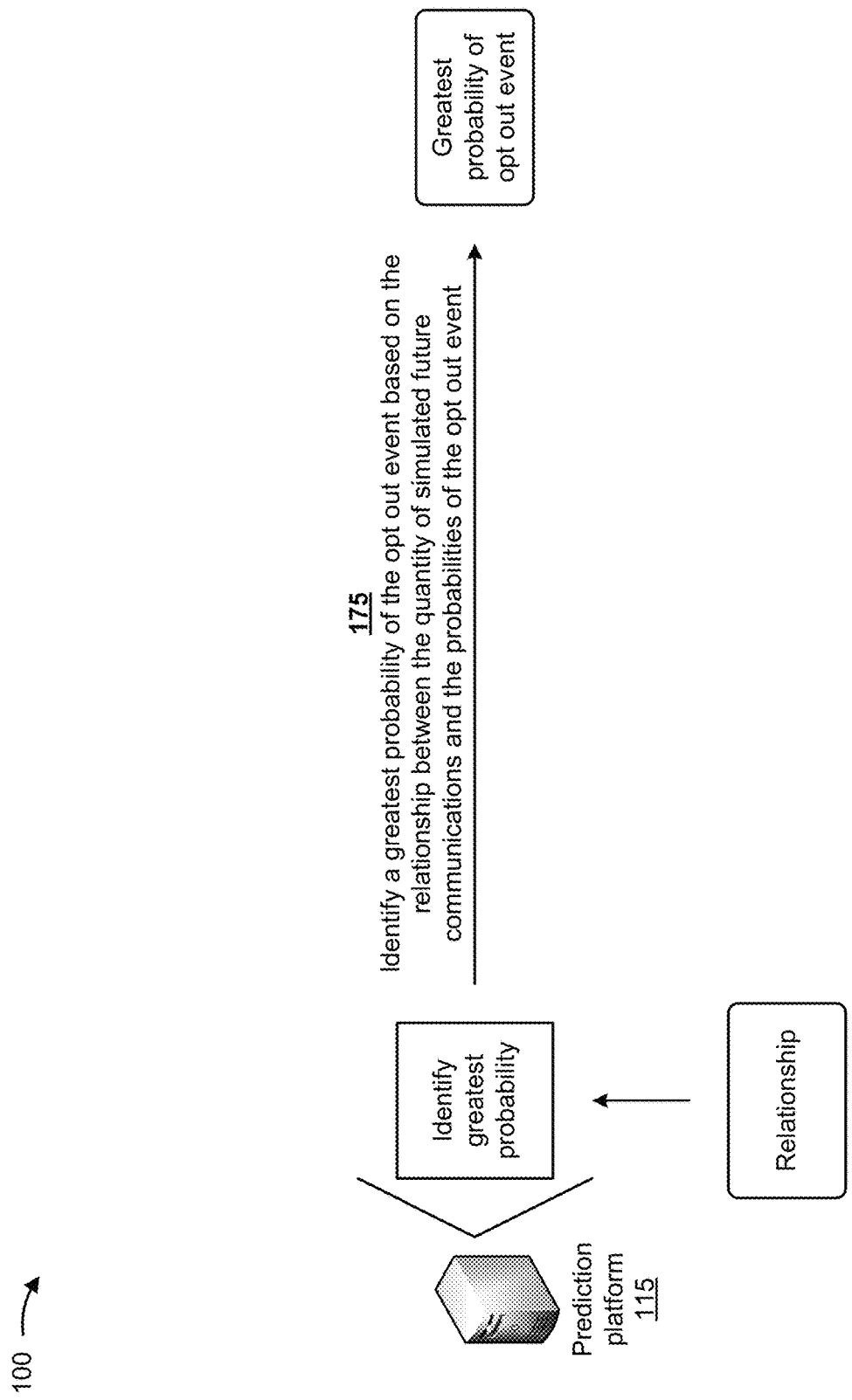

As shown in FIG. 1H, and by reference number 175, prediction platform 115 may identify a particular (e.g., a greatest) probability of the opt out event based on the relationship between the quantity of simulated future communications and the probabilities of the opt out event. In some implementations, the particular probability of the opt out event may include a greatest probability, a probability other than the greatest probability, and/or the like. In some implementations, the particular probability of the opt out event may include a minimal representation of at least one non-probability value from the probability distribution.

For example, in a two dimensional probability distribution of the opt out event and a quantity of simulated emails sent to the customer, prediction platform 115 may identify, as the greatest probability of the opt out event, a greatest numerical opt out probability value in the probability distribution that corresponds to at least one specific count of simulated emails sent to the customer. In this case, the minimal representation of the quantity of simulated emails sent (e.g., non-probability value) may include a smallest count, of the counts of the simulated emails sent to the customer, that corresponds to the greatest probability value.

Figure 1I:
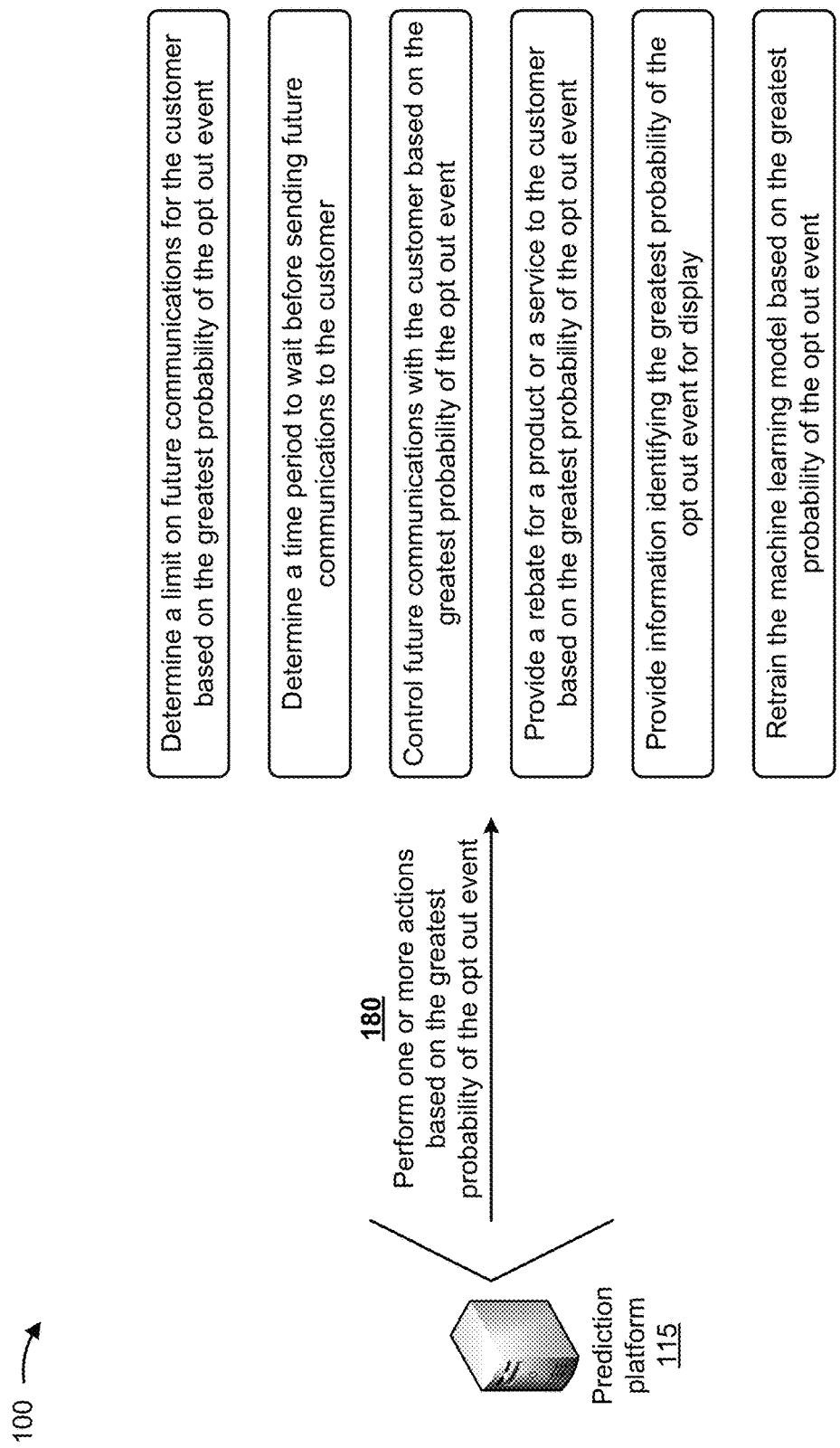

As shown in FIG. 1I, and by reference number 180, prediction platform 115 may perform one or more actions based on the greatest probability of the opt out event. In some implementations, the one or more actions may include prediction platform 115 determining a limit on future communications for the customer based on the greatest probability of the opt out event. For example, prediction platform 115 may determine a limit or a cap to be imposed on a quantity of emails that can be sent to the customer in a specific period of time. Prediction platform 115 may determine the limit based on a largest jump in the probability distribution (e.g., a largest rate of change) that represents the probability of the opt out event. Additionally, prediction platform 115 may utilize the limit to refrain from a future communication with the customer. In this way, prediction platform 115 may avoid a future communication that could cause an opt out event by the customer, thereby preserving revenues associated with continuing sales opportunities, preserving public reputation by avoiding negative reviews, and/or the like, which may conserve resources that would otherwise be required to recapture customers, repair public reputation, and/or the like.

In some implementations, the one or more actions may include prediction platform 115 determining a time period to wait before sending future communications to the customer. For example, prediction platform 115 may determine a time period to wait before sending a future communication of the quantity of future communications associated with the greatest probability of the opt out event. In some implementations, prediction platform 115 may determine the time period based on time differences among data elements of the first contact data and/or the second contact data (e.g., a time difference between contact events, a time difference between a contact event and an opt out event, and/or the like). Additionally, prediction platform 115 may utilize the time period to refrain from a future communication with the customer until the time period has passed. In this way, prediction platform 115 may reduce the chances that a future communication will cause an opt out event by the customer, thereby preserving revenues associated with continuing sales opportunities, preserving public reputation, and/or the like.

In some implementations, the one or more actions may include prediction platform 115 controlling future communications with the customer based on the greatest probability of the opt out event. For example, prediction platform 115 may reduce a quantity of future communications with the customer, may reduce a frequency of future communications with the customer, may alter a form of communication used in future communications with the customer, may alter content used in future communications with the customer, and/or the like. In this way, prediction platform 115 may reduce the chances of opt out events by customers by not communicating too many times or too frequently, may reduce the chances of future communications resulting in opt out events by utilizing a form or content less likely to offend customers, and/or the like.

In some implementations, the one or more actions may include prediction platform 115 providing a rebate for a product or a service to the customer based on the greatest probability of the opt out event. In this way, prediction platform 115 may reduce the chances of future communications resulting in opt out events by incentivizing the customer to make a purchase, to remain a customer, and/or the like, thereby preserving revenues associated with potential sales, conserving resources that would otherwise be required to recapture customers, and/or the like.

In some implementations, the one or more actions may include prediction platform 115 providing information identifying the greatest probability of the opt out event for display. For example, prediction platform 115 may provide the information to a marketing professional prior to a future communication being provided to the customer. In this way, prediction platform 115 may warn the marketing professional to refrain from engaging in the future communication that the has a greatest probability an opt out event by a customer. Additionally, or alternatively, prediction platform 115 may automatically prevent a future communication, may automatically warn a sender of the future communication (e.g., by flagging an email, intervening between dialing a telephone number and connecting a phone call, intervening before providing a post to social media, and/or the like), and/or the like. In this way, prediction platform 115 may automatically prevent a future communication that could result an opt out event by a customer.

In some implementations, the one or more actions may include prediction platform 115 retraining the machine learning model based on the greatest probability of the opt out event. In this way, prediction platform 115 may improve the accuracy of the machine learning model in determining probability distributions for opt out events, which may improve speed and efficiency of the machine learning model and conserve computing resources, network resources, and/or the like.

In some implementations, prediction platform 115 may determine a contact strategy for the customer based on a particular (e.g., greatest) probability of the opt out event, and may cause the contact strategy to be implemented for the customer. In some implementations, prediction platform 115 may identify another customer that is substantially similar to the customer, may determine a contact strategy for the customer based on the particular probability of the opt out event, and may cause the contact strategy to be implemented for the other customer.

In this way, several different stages of the process for predicting a communication opt out event are automated via machine learning, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that utilizes a machine learning model to predict a communication opt out event in the manner described herein. Finally, the process for utilizing a machine learning model to predict a communication opt out event conserves computing resources, networking resources, and/or the like that would otherwise be wasted in sending unwanted communications to customers, generating incorrect predictions of what level of communications may be preferred by customers and when customers will opt out of communications, causing customers to opt out of communications based on the incorrect predictions, attempting to encourage such customers to agree to receive communications again, and/or the like.

As indicated above, FIGS. 1A-1I are provided merely as examples. Other examples may differ from what is described with regard to FIGS. 1A-1I. The number and arrangement of devices and networks shown in FIGS. 1A-1I are provided as an example. In practice, there may be additional devices and/or networks, fewer devices and/or networks, different devices and/or networks, or differently arranged devices and/or networks than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) of FIGS. 1A-1I may perform one or more functions described as being performed by another set of devices of FIGS. 1A-1I.

Figure 2:
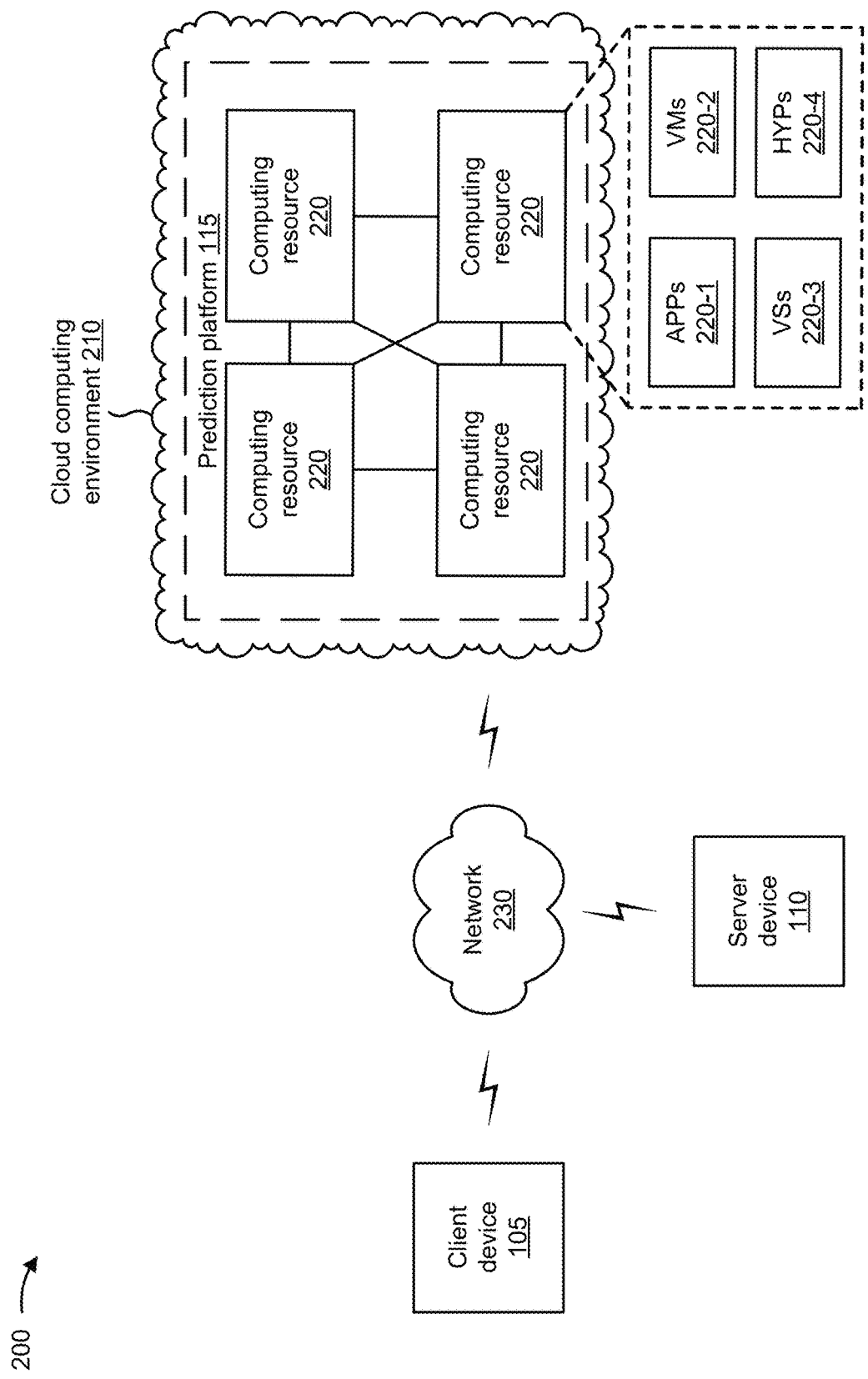
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include client device 105, server device 110, prediction platform 115, and a network 230. Devices of environment 200 may interconnect via wired connections, wireless connections, or a combination of wired and wireless connections.

Client device 105 includes one or more devices capable of receiving, generating, storing, processing, and/or providing information, such as information described herein. For example, client device 105 may include a mobile phone (e.g., a smart phone, a radiotelephone, and/or the like), a laptop computer, a tablet computer, a desktop computer, a handheld computer, a set-top box, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 105 may receive information from and/or transmit information to server device 110 and/or prediction platform 115.

Server device 110 includes one or more devices capable of receiving, generating, storing, processing, and/or providing information, as described herein. For example, server device 110 may include a laptop computer, a tablet computer, a desktop computer, a group of server devices, or a similar type of device. In some implementations, server device 110 may receive information from and/or transmit information to client device 105 and/or prediction platform 115.

Prediction platform 115 includes one or more devices that utilize a machine learning model to predict a communication opt out event. In some implementations, prediction platform 115 may be designed to be modular such that certain software components may be swapped in or out depending on a particular need. As such, prediction platform 115 may be easily and/or quickly reconfigured for different uses. In some implementations, prediction platform 115 may receive information from and/or transmit information to one or more client devices 105 and/or server device 110.

In some implementations, as shown, prediction platform 115 may be hosted in a cloud computing environment 210. Notably, while implementations described herein describe prediction platform 115 as being hosted in cloud computing environment 210, in some implementations, prediction platform 115 may not be cloud-based (i.e., may be implemented outside of a cloud computing environment) or may be partially cloud-based.

Cloud computing environment 210 includes an environment that hosts prediction platform 115. Cloud computing environment 210 may provide computation, software, data access, storage, etc., services that do not require end-user knowledge of a physical location and configuration of system(s) and/or device(s) that host prediction platform 115. As shown, cloud computing environment 210 may include a group of computing resources 220 (referred to collectively as "computing resources 220" and individually as "computing resource 220").

Computing resource 220 includes one or more personal computers, workstation computers, mainframe devices, or other types of computation and/or communication devices. In some implementations, computing resource 220 may host prediction platform 115. The cloud resources may include compute instances executing in computing resource 220, storage devices provided in computing resource 220, data transfer devices provided by computing resource 220, etc. In some implementations, computing resource 220 may communicate with other computing resources 220 via wired connections, wireless connections, or a combination of wired and wireless connections.

As further shown in FIG. 2, computing resource 220 includes a group of cloud resources, such as one or more applications ("APPs") 220-1, one or more virtual machines ("VMs") 220-2, virtualized storage ("VSs") 220-3, one or more hypervisors ("HYPs") 220-4, and/or the like.

Application 220-1 includes one or more software applications that may be provided to or accessed by client device 105. Application 220-1 may eliminate a need to install and execute the software applications on client device 105. For example, application 220-1 may include software associated with prediction platform 115 and/or any other software capable of being provided via cloud computing environment 210. In some implementations, one application 220-1 may send/receive information to/from one or more other applications 220-1, via virtual machine 220-2.

Virtual machine 220-2 includes a software implementation of a machine (e.g., a computer) that executes programs like a physical machine. Virtual machine 220-2 may be either a system virtual machine or a process virtual machine, depending upon use and degree of correspondence to any real machine by virtual machine 220-2. A system virtual machine may provide a complete system platform that supports execution of a complete operating system ("OS"). A process virtual machine may execute a single program and may support a single process. In some implementations, virtual machine 220-2 may execute on behalf of a user (e.g., a user of client device 105 or an operator of prediction platform 115), and may manage infrastructure of cloud computing environment 210, such as data management, synchronization, or long-duration data transfers.

Virtualized storage 220-3 includes one or more storage systems and/or one or more devices that use virtualization techniques within the storage systems or devices of computing resource 220. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 220-4 may provide hardware virtualization techniques that allow multiple operating systems (e.g., "guest operating systems") to execute concurrently on a host computer, such as computing resource 220. Hypervisor 220-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. In some implementations, network 230 may receive information from and/or transmit information to client device 105 and/or prediction platform 115.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
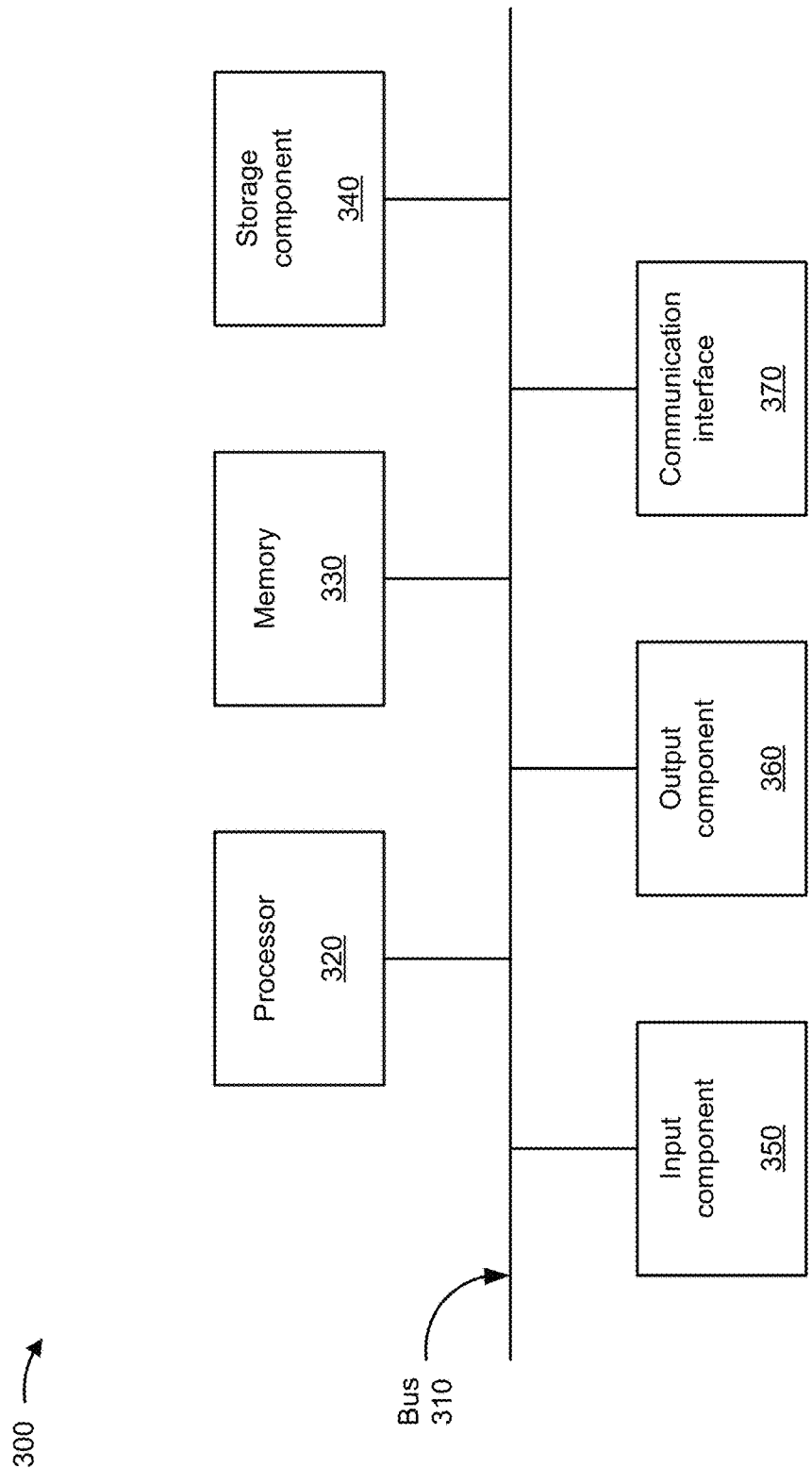
FIG. 3 is a diagram of example components of one or more devices of FIG. 2.

FIG. 3 is a diagram of example components of a device 300. Device 300 may correspond to client device 105, server device 110, prediction platform 115, and/or computing resource 220. In some implementations, client device 105, server device 110, prediction platform 115, and/or computing resource 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
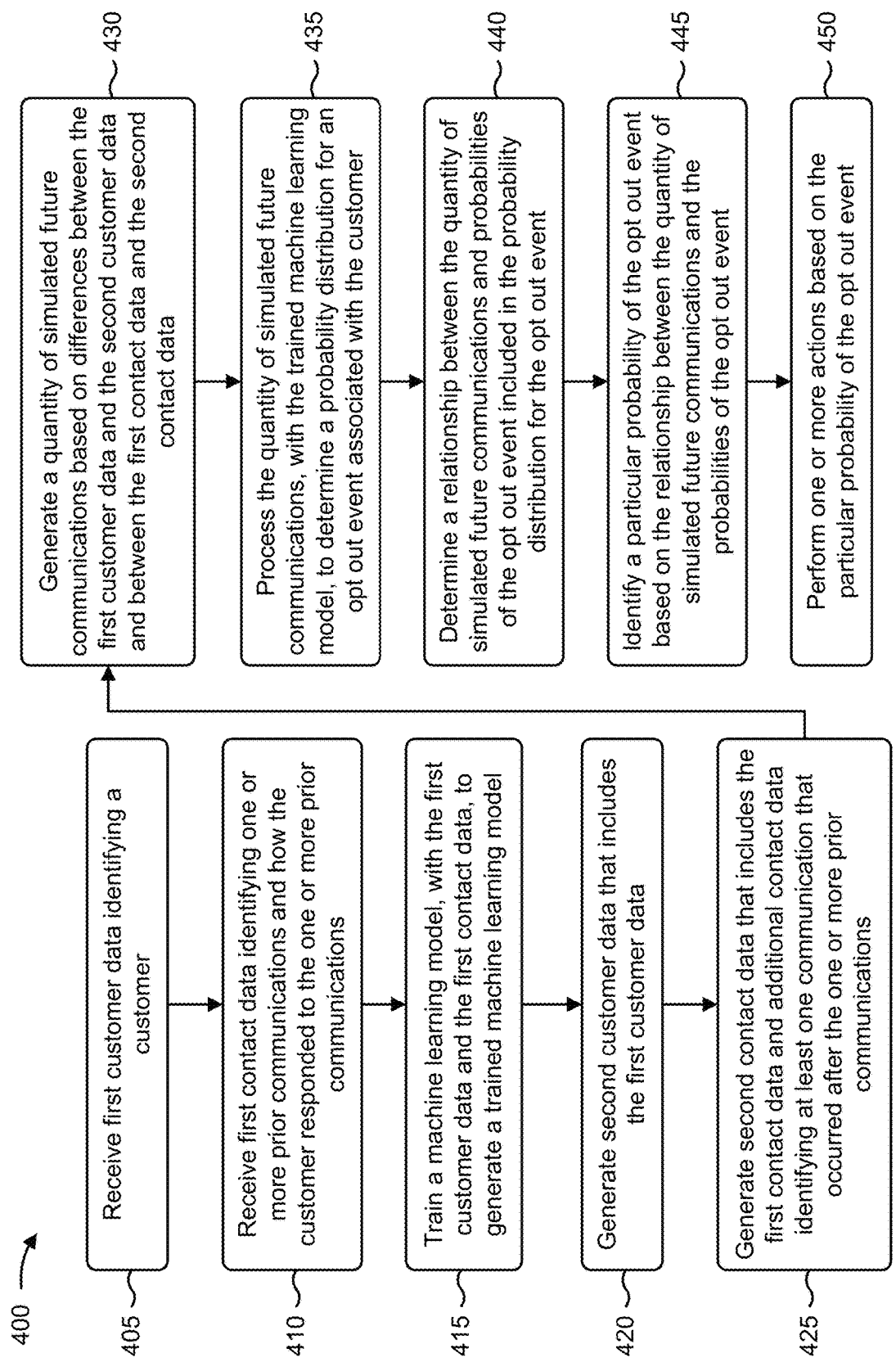
FIG. 4 is a flow chart of an example process for utilizing a machine learning model to predict a communication opt out event.

FIG. 4 is a flow chart of an example process 400 for utilizing a machine learning model to predict a communication opt out event. In some implementations, one or more process blocks of FIG. 4 may be performed by a device (e.g., prediction platform 115). In some implementations, one or more process blocks of FIG. 4 may be performed by another device or a group of devices separate from or including the device, such as a client device (e.g., client device 105) and/or a server device (e.g., server device 110).

As shown in FIG. 4, process 400 may include receiving first customer data identifying a customer (block 405). For example, the device (e.g., using computing resource 220, processor 320, communication interface 370, and/or the like) may receive first customer data identifying a customer, as described above. The first customer data may include data identifying demographics associated with the customer, a geographic location of the customer, segmentation associated with the customer, a financial account of the customer, a time period that the customer is associated with an entity, or usage of a product or a service of the entity by the customer.

As further shown in FIG. 4, process 400 may include receiving first contact data identifying the one or more prior communications and how the customer responded to the one or more prior communications (block 410). For example, the device (e.g., using computing resource 220, processor 320, communication interface 370, and/or the like) may receive first contact data identifying the one or more prior communications and how the customer responded to the one or more prior communications, as described above. The first contact data may include data identifying whether the customer accepted the one or more prior communications, whether the customer rejected the one or more prior communications, whether the customer ignored the one or more prior communications, whether the customer received the one or more prior communications, whether the customer opened the one or more prior communications, or whether the customer selected on one or more items included within the one or more prior communications.

In some implementations, receiving the first contact data may include providing one or more generated communications to a client device associated with the customer over a time period, and receiving the first contact data based on providing the one or more generated communications to the client device.

As further shown in FIG. 4, process 400 may include training a machine learning model, with the first customer data and the first contact data, to generate a trained machine learning model (block 415). For example, the device (e.g., using computing resource 220, processor 320, memory 330, and/or the like) may train a machine learning model, with the first customer data and the first contact data, to generate a trained machine learning model, as described above.

As further shown in FIG. 4, process 400 may include generating second customer data that includes the first customer data (block 420). For example, the device (e.g., using computing resource 220, processor 320, storage component 340, and/or the like) may generate second customer data that includes the first customer data, as described above.

As further shown in FIG. 4, process 400 may include generating second contact data that includes the first contact data and additional contact data identifying at least one communication that occurred after the one or more prior communications (block 425). For example, the device (e.g., using computing resource 220, processor 320, memory 330, storage component 340, and/or the like) may generate second contact data that includes the first contact data and additional contact data identifying at least one communication that occurred after the one or more prior communications, as described above.

As further shown in FIG. 4, process 400 may include generating a quantity of simulated future communications based on differences between the first customer data and the second customer data and between the first contact data and the second contact data (block 430). For example, the device (e.g., using computing resource 220, processor 320, memory 330, and/or the like) may generate a quantity of simulated future communications based on differences between the first customer data and the second customer data and between the first contact data and the second contact data, as described above. The simulated future communications may include a simulated email sent to the customer, a simulated text message sent to the customer, a simulated telephone call with the customer, or a simulated social media post to the customer.

As further shown in FIG. 4, process 400 may include processing the quantity of simulated future communications, with the trained machine learning model, to determine a probability distribution for an opt out event associated with the customer (block 435). For example, the device (e.g., using computing resource 220, processor 320, storage component 340, and/or the like) may process the quantity of simulated future communications, with the trained machine learning model, to determine a probability distribution for an opt out event associated with the customer, as described above.

In some implementations, processing the quantity of simulated future communications, with the trained machine learning model, to determine the probability distribution for the opt out event may include simulating provision of each of the quantity of simulated future communications to the customer; determining each of the probabilities of the opt out event based on simulated provision of each of the quantity of simulated future communications to the customer; and generating the probability distribution for the opt out event based on the probabilities of the opt out event.

As further shown in FIG. 4, process 400 may include determining a relationship between the quantity of simulated future communications and probabilities of the opt out event included in the probability distribution for the opt out event (block 440). For example, the device (e.g., using computing resource 220, processor 320, memory 330, storage component 340, and/or the like) may determine a relationship between the quantity of simulated future communications and probabilities of the opt out event included in the probability distribution for the opt out event, as described above.

As further shown in FIG. 4, process 400 may include identifying a particular probability of the opt out event based on the relationship between the quantity of simulated future communications and the probabilities of the opt out event (block 445). For example, the device (e.g., using computing resource 220, processor 320, memory 330, and/or the like) may identify a particular probability of the opt out event based on the relationship between the quantity of simulated future communications and the probabilities of the opt out event, as described above. The probability distribution for the opt out event associated with the customer may include a multi-dimensional distribution, with the probabilities of the opt out event being at least one dimension and the quantity of simulated future communications being at least another dimension. The particular probability of the opt out event may include a minimal representation of at least one non-probability value from the probability distribution.

As further shown in FIG. 4, process 400 may include performing one or more actions based on the particular probability of the opt out event (block 450). For example, the device (e.g., using computing resource 220, processor 320, memory 330, storage component 340, communication interface 370, and/or the like) may perform one or more actions based on the particular probability of the opt out event, as described above.

In some implementations, performing the one or more actions may include determining a limit on future communications for the customer based on the particular probability of the opt out event; determining a time period to wait before sending future communications to the customer; or controlling future communications with the customer based on the particular probability of the opt out event.

In some implementations, performing the one or more actions may include providing a rebate for a product or a service to the customer based on the particular probability of the opt out event; providing information identifying the particular probability of the opt out event for display; or retraining the machine learning model based on the particular probability of the opt out event.

Process 400 may include additional implementations, such as any single implementation or any combination of implementations described below and/or in connection with one or more other processes described elsewhere herein.

In some implementations, process 400 may include establishing a date associated with the first customer data and the first contact data, where the first customer data and the first contact data may include data that is received prior to the date.

In some implementations, process 400 may include determining a contact strategy for the customer based on the particular probability of the opt out event, and causing the contact strategy to be implemented for the customer.

In some implementations, process 400 may include identifying another customer that is substantially similar to the customer; determining a contact strategy for the customer based on the particular probability of the opt out event; and causing the contact strategy to be implemented for the other customer.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, first customer data identifying a customer;
   receiving, by the device, first contact data identifying one or more prior communications and how the customer responded to the one or more prior communications;
   training, by the device, a machine learning model, with the first customer data and the first contact data, to generate a trained machine learning model;
   generating, by the device, second customer data that includes the first customer data;
   generating, by the device, second contact data that includes the first contact data and additional contact data identifying at least one communication that occurred after the one or more prior communications;
   generating, by the device, a quantity of simulated future communications based on differences between the first customer data and the second customer data and between the first contact data and the second contact data;
   processing, by the device, the quantity of simulated future communications, with the trained machine learning model, to determine a probability distribution for an opt out event associated with the customer;
   determining, by the device, a relationship between the quantity of simulated future communications and probabilities of the opt out event included in the probability distribution for the opt out event;
   identifying, by the device, a particular probability of the opt out event based on the relationship between the quantity of simulated future communications and the probabilities of the opt out event; and
   performing, by the device, one or more actions based on the particular probability of the opt out event.

2. The method of claim 1, wherein the first customer data includes data identifying at least one of:
   demographics associated with the customer,
   a geographic location of the customer,
   segmentation associated with the customer,
   a financial account of the customer,
   a time period that the customer is associated with an entity, or
   usage of a product or a service of the entity by the customer.

3. The method of claim 1, wherein the first contact data includes data identifying at least one of:
   whether the customer accepts the one or more prior communications,
   whether the customer rejects the one or more prior communications,
   whether the customer ignores the one or more prior communications,
   whether the customer receives the one or more prior communications,
   whether the customer opens the one or more prior communications, or
   whether the customer selects on one or more items included within the one or more prior communications.

4. The method of claim 1, wherein receiving the first contact data comprises:
   providing one or more generated communications to a client device associated with the customer over a time period; and
   receiving the first contact data based on providing the one or more generated communications to the client device, wherein the first contact data identifies the one or more generated communications and how the customer responded to the one or more generated communications.

5. The method of claim 1, wherein performing the one or more actions comprises one or more of:

determining a limit on future communications for the customer based on the particular probability of the opt out event;
determining a time period to wait before sending future communications to the customer; or
controlling future communications with the customer based on the particular probability of the opt out event.

6. The method of claim 1, wherein performing the one or more actions comprises one or more of:
providing a rebate for a product or a service to the customer based on the particular probability of the opt out event;
providing information identifying the particular probability of the opt out event for display; or
retraining the machine learning model based on the particular probability of the opt out event.

7. The method of claim 1, wherein the probability distribution for the opt out event associated with the customer includes a multi-dimensional distribution with the probabilities of the opt out event being at least one dimension and the quantity of simulated future communications being at least another dimension.

8. A device, comprising:
one or more memories; and
one or more processors, operatively coupled to the one or more memories, configured to:
receive first customer data identifying a customer;
receive first contact data identifying one or more prior communications and how the customer responded to the one or more prior communications;
generate second customer data that includes the first customer data;
generate second contact data that includes the first contact data and additional contact data identifying at least one communication that occurred after the one or more prior communications;
generate a quantity of simulated future communications based on differences between the first customer data and the second customer data and between the first contact data and the second contact data;
process the quantity of simulated future communications, with a machine learning model, to determine a probability distribution for an opt out event associated with the customer,
wherein the machine learning model has been trained with the first customer data and the first contact data;
determine a relationship between the quantity of simulated future communications and probabilities of the opt out event included in the probability distribution for the opt out event;
identify a particular probability of the opt out event based on the relationship between the quantity of simulated future communications and the probabilities of the opt out event; and
cause a limit on future communications for the customer to be implemented based on the particular probability of the opt out event.

9. The device of claim 8, wherein the simulated future communications include one or more of:
a simulated email sent to the customer,
a simulated text message sent to the customer,
a simulated telephone call with the customer, or
a simulated social media post to the customer.

10. The device of claim 8, wherein the one or more processors, when processing the quantity of simulated future communications, with the machine learning model, to determine the probability distribution for the opt out event, are configured to:
simulate provision of each of the quantity of simulated future communications to the customer;
determine each of the probabilities of the opt out event based on simulated provision of each of the quantity of simulated future communications to the customer; and
generate the probability distribution for the opt out event based on the probabilities of the opt out event.

11. The device of claim 8, wherein the one or more processors are further configured to:
establish a date associated with the first customer data and the first contact data,
wherein the first customer data and the first contact data include data that is received prior to the date.

12. The device of claim 8, wherein the particular probability of the opt out event includes a minimal representation of at least one non-probability value from the probability distribution.

13. The device of claim 8, wherein the one or more processors are further configured to:
determine a contact strategy for the customer based on the particular probability of the opt out event; and
cause the contact strategy to be implemented for the customer.

14. The device of claim 8, wherein the one or more processors are further configured to:
identify another customer that is substantially similar to the customer;
determine a contact strategy for the customer based on the particular probability of the opt out event; and
cause the contact strategy to be implemented for the other customer.

15. A non-transitory computer-readable medium storing instructions, the instructions comprising:
one or more instructions that, when executed by one or more processors, cause the one or more processors to:
receive first customer data identifying a customer;
receive first contact data identifying one or more prior communications and how the customer responded to the one or more prior communications;
generate second customer data that includes the first customer data;
generate second contact data that includes the first contact data and additional contact data identifying at least one communication that occurred after the one or more prior communications;
generate a quantity of simulated future communications based on differences between the first customer data and the second customer data and between the first contact data and the second contact data;
process the quantity of simulated future communications, with a machine learning model, to determine a probability distribution for an opt out event associated with the customer,
wherein the machine learning model has been trained with the first customer data and the first contact data;
determine a relationship between the quantity of simulated future communications and probabilities of the opt out event included in the probability distribution for the opt out event;
identify a particular probability of the opt out event based on the relationship between the quantity of simulated future communications and the probabilities of the opt out event; and perform one or more actions based on the particular probability of the opt out event.

16. The non-transitory computer-readable medium of claim 15, wherein the one or more instructions, that cause the one or more processors to receive the first contact data, cause the one or more processors to:
provide one or more generated communications to a client device associated with the customer over a time period; and
receive the first contact data based on providing the one or more generated communications to the client device, wherein the first contact data identifies the one or more generated communications and how the customer responded to the one or more generated communications.

17. The non-transitory computer-readable medium of claim 15, wherein the one or more instructions, that cause the one or more processors to perform the one or more actions, cause the one or more processors to one or more of:
determine a limit on future communications for the customer based on the particular probability of the opt out event;
determine a time period to wait before sending future communications to the customer; or
control future communications with the customer based on the particular probability of the opt out event;
provide a rebate for a product or a service to the customer based on the particular probability of the opt out event;
provide information identifying the particular probability of the opt out event for display; or
retrain the machine learning model based on the particular probability of the opt out event.

18. The non-transitory computer-readable medium of claim 15, wherein the one or more instructions, that cause the one or more processors to process the quantity of simulated future communications, with the machine learning model, to determine the probability distribution for the opt out event, cause the one or more processors to:
simulate provision of each of the quantity of simulated future communications to the customer;
determine each of the probabilities of the opt out event based on simulated provision of each of the quantity of simulated future communications to the customer; and
generate the probability distribution for the opt out event based on the probabilities of the opt out event.

19. The non-transitory computer-readable medium of claim 15, wherein the one or more instructions, that cause the one or more processors to perform the one or more actions, cause the one or more processors to:
determine a contact strategy for the customer based on the particular probability of the opt out event; and
cause the contact strategy to be implemented for the customer.

20. The non-transitory computer-readable medium of claim 15, wherein the one or more instructions, that cause the one or more processors to perform the one or more actions, cause the one or more processors to:
identify another customer that is substantially similar to the customer;
determine a contact strategy for the customer based on the particular probability of the opt out event; and
cause the contact strategy to be implemented for the other customer.

* * * * *